United States Patent
O'Toole, Jr.

(10) Patent No.: US 7,158,624 B1
(45) Date of Patent: Jan. 2, 2007

(54) METHODS AND APPARATUS FOR SELECTIVELY INCLUDING AN AUDIO SIGNAL COMPONENT WITHIN AN AUDIO OUTPUT SIGNAL

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 944 days.

(21) Appl. No.: 10/172,947

(22) Filed: Jun. 17, 2002

(51) Int. Cl.
*H04M 3/42* (2006.01)

(52) U.S. Cl. ............... 379/202.01; 379/201.1; 379/207.12

(58) Field of Classification Search ........... 379/202.01, 379/207.01, 215.01, 88.22, 201.1, 207.12
See application file for complete search history.

(56) References Cited

U.S. PATENT DOCUMENTS

| | | | |
|---|---|---|---|
| 5,497,415 A | 3/1996 | Kagi | 379/393 |
| 5,619,561 A * | 4/1997 | Reese | 379/142.08 |
| 5,991,374 A | 11/1999 | Hazenfield | 379/101.01 |
| 6,138,030 A | 10/2000 | Coombes et al. | 455/507 |
| 6,219,415 B1 | 4/2001 | Deutsch et al. | 379/215 |
| 6,393,272 B1 | 5/2002 | Cannon et al. | 455/413 |
| 6,400,804 B1 * | 6/2002 | Bilder | 379/76 |
| 6,453,022 B1 * | 9/2002 | Weinman, Jr. | 379/88.13 |
| 6,768,722 B1 * | 7/2004 | Katseff et al. | 370/260 |

* cited by examiner

*Primary Examiner*—Bing Q. Bui
(74) *Attorney, Agent, or Firm*—BainwoodHuang

(57) ABSTRACT

An apparatus and method selectively includes an audio signal component, such as hold music or a hold tone, within an audio output signal, such as a composite audio signal from a multi-party teleconference, based upon a condition of an audio delivery system. In one arrangement, the condition is based upon a presence characteristic, indicating the number of active endpoint devices in the audio delivery system and upon an endpoint signal, indicating non-participation of one of the active endpoint devices. Based upon the condition of the audio delivery system, the audio delivery system either omits the audio signal component from the audio output signal or includes the audio signal component with the audio output signal distributed within the system.

33 Claims, 8 Drawing Sheets

METHODS AND APPARATUS FOR SELECTIVELY INCLUDING AN AUDIO SIGNAL COMPONENT WITHIN AN AUDIO OUTPUT SIGNAL

BACKGROUND OF THE INVENTION

Telecommunications systems are typically formed of telecommunications devices, such as telephones, connected within a telecommunications network. These systems allow communication among users connected to the system.

In conventional telecommunications systems, a first user can prevent transmission of an audio signal, such as a signal carrying the first user's voice, from his telecommunications device to the telecommunications device of a second user. Typically, in these systems, the first user engages a "hold" feature on his telephone to prevent an audio signal transmission to the second user. In certain telecommunications systems, engagement of the "hold" feature by a sender or first user both prevents transmission of an audio signal from the first user's telecommunications device and causes the transmission of an audio signal component, such as hold music or a hold tone, to the receiver or second user.

In one conventional system, after a user engages the "hold" feature of his telecommunications device, the telecommunications device generates an audio signal component, such as hold music, and transmits the audio signal component to a receiver or second user. In another conventional system, after a user engages the "hold" feature on his telecommunications device, an intermediary device located between the sender and a receiver generates a signal carrying hold music, in response to engagement of the "hold" feature. In one example, a Private Branch Exchange (PBX) switch, which is a privately owned switch that interfaces to a telephone or telecommunications network, connects to a sender's telecommunications device or handset. The PBX switch generates a signal carrying the hold music after the sender engages the "hold" feature on his handset and transmits the signal to a receiver.

Conventional telecommunications systems allow more than two users to communicate simultaneously in a teleconference. These systems typically are formed of a hub or relay device, such as a conference call manager, and telecommunications devices, such as telephones, connected to the relay device. During a teleconference, each telecommunications device transmits audio signals to the hub. The hub receives each audio signal, forms a composite audio signal from the received audio signals, and, in turn, transmits the composite audio signal to the telecommunications devices.

SUMMARY OF THE INVENTION

Conventional telecommunications systems allow a first user connected to the system the ability to place another user connected to the system on "hold" or otherwise prevent transmission or reception of an audio signal by the first user. These conventional systems, however, include several disadvantages when applied to multi-party teleconferencing. In multi-party teleconferencing, several users or parties are simultaneously connected in a telecommunications system, thereby allowing communication among the parties. In conventional systems, when a first user engages the "hold" feature of his telecommunications device, each of the other users connected to the system receives hold audio, such as a hold tone or hold music, to indicate the temporary suspension of the first user from the teleconference. The disadvantage of such a system in multi-party teleconferencing is that, because each of the other users receives the hold tone, the other users cannot communicate with each other. The distribution of hold audio in a multi-party teleconference, therefore, interrupts the teleconference and impedes communications among the users placed on "hold". Moreover, the remaining users cannot contact a source user to direct that server user to stop the hold audio because the source user is no longer actively engaged in the teleconference.

In order to prevent interruption of a teleconference in the manner described, an audio delivery system (e.g. a telephone system) can suppress or prevent delivery of hold audio to participants in a multi-party teleconference after a user engages a hold function on his telecommunications device (e.g. telephone). The present invention is directed to an apparatus and method to selectively include an audio signal component, such as hold audio, within an audio output signal, such as a composite audio signal from a multi-party teleconference, based upon a condition of an audio delivery system. The condition of the audio delivery system is, in one arrangement, based upon the number of active endpoint devices (e.g. telephones) connected to the audio delivery system and based upon the presence of an endpoint signal from an endpoint device. The endpoint signal, in one arrangement, indicates the engagement of a hold function on an endpoint device. The endpoint signal includes an audio signal component, such as hold music, where the endpoint device itself distributes the audio signal component to the audio delivery system. The endpoint signal also includes a trigger signal to an external device, where the trigger signal causes the external device to distribute the audio signal component to the audio delivery system. The audio delivery system utilizes the condition information and generates a control signal having a value that controls the inclusion or omission of the audio signal component based upon the condition information.

One embodiment of the invention involves a method to selectively include an audio signal component within an audio output signal. The method includes the steps of obtaining a control signal based on a condition of the audio delivery system, omitting from the audio output signal the audio signal component when the control signal has a first value, and including within the audio output signal the audio signal component when the control signal has a second value which is different than the first value.

Application of this method by an audio delivery system prevents or suppresses distribution of an audio signal component, such as hold audio, to endpoint devices connected within the audio delivery system. The method, therefore, prevents interruption of a teleconference by distribution of hold audio within the audio delivery system.

In one embodiment, the step of obtaining the control signal includes the step of generating the control signal. The control signal has the first value in response to a presence characteristic indicating the presence of greater than two active endpoint devices of the audio delivery system and a suppression characteristic indicating non-participation of one of the active endpoint devices. The control signal has the second value in response to a presence characteristic indicating the presence of two active endpoint devices of the audio delivery system and a suppression characteristic indicating non-participation of one of the active endpoint devices. This step prevents distribution of hold audio, generated as part of, or in response to, the suppression characteristic, within the audio delivery system during a multi-party teleconference.

In one arrangement, the method further includes the step of generating the presence characteristic where the presence characteristic is a watermark indicating the presence of an endpoint device within the audio delivery system. The watermark can be integrated with an audio signal within the audio delivery system and distributed as part of the audio signal within the audio delivery system. In an audio distribution system having watermark decoding capabilities, the system decodes the watermark and uses the watermark to track the number of active endpoint devices within the system. This allows the system to determine if a teleconference includes more than two active endpoint devices, thereby indicating a multi-party teleconference.

In another arrangement, the method includes the step of generating the suppression characteristic where the suppression characteristic is a watermark indicating the non-participation of an active endpoint device. The watermark can be integrated with an audio signal within the audio delivery system and distributed as part of the audio signal within the audio delivery system. In an audio distribution system having watermark decoding capabilities, the system decodes the watermark and uses the watermark to detect the engagement of a hold function by an active endpoint device within the system. In another arrangement, the method includes the step of generating the suppression characteristic wherein the suppression characteristic is an endpoint signal generated by an active endpoint device. The endpoint signal includes, for example, hold music or a hold tone generated by the endpoint device. The endpoint signal also includes a signal transmitted to an external device to activate the transmission of hold music or a hold tone within the system, for example.

In one embodiment, the step of obtaining the control signal includes the step of generating the control signal. The control signal has the first value in response to a presence characteristic indicating the presence of greater than two active endpoint devices of the audio delivery system and an engagement characteristic generated by an active endpoint device indicating non-participation of the active endpoint device. The control signal has the second value in response to a presence characteristic indicating the presence of two active endpoint devices of the audio delivery system and an engagement characteristic generated by an active endpoint device indicating non-participation of the active endpoint device. This step allows the system to prevent distribution of hold audio, generated as part of, or in response to, the engagement characteristic, within the audio delivery system during a multi-party teleconference.

In one arrangement, the method includes the step of generating the engagement characteristic where the engagement characteristic is an endpoint signal generated by the active endpoint device, based upon engagement of a series of functions from the active endpoint device. For example, a user engages a mute function and a hold function from the active endpoint device to generate the endpoint signal.

In one embodiment, the step of obtaining the control signal includes the step of generating the control signal where the control signal has the first value in response to a presence characteristic indicating the presence of greater than two active endpoint devices of the audio delivery system and a marker characteristic indicating non-participation of one of the active endpoint devices. The control signal has the second value in response to a presence characteristic indicating the presence of two active endpoint devices of the audio delivery system and a marker characteristic indicating non-participation of one of the active endpoint devices in this arrangement. This step allows the system to prevent distribution of hold audio, generated as part of, or in response to, the engagement characteristic, within the audio delivery system during a multi-party teleconference.

In one arrangement, the method includes the step of generating the marker characteristic wherein the marker characteristic is a watermark. The system then integrates the watermark with an audio signal within the audio delivery system and distributes the audio signal and watermark within the audio delivery system. In another arrangement, the method includes the step of generating the marker characteristic wherein the marker characteristic is a tag associated with an audio signal within the audio delivery system. The process of watermarking encodes an audio signal, for example, with data without disrupting the content of the audio signal. The use of the watermark allows the data to be transmitted through existing telecommunications systems without disruption of the data.

Another embodiment of the invention relates to an audio delivery system including at least two endpoint devices and an audio delivery device having at least one communications interface, a controller, and an interconnection mechanism coupling the at least one communications interface and the controller. The controller is configured to obtain a control signal based on a condition of the audio delivery system, omit, from the audio output signal, the audio signal component when the control signal has a first value, and include, within the audio output signal, the audio signal component when the control signal has a second value which is different than the first value. In one arrangement, the controller includes a memory and a processor.

Another embodiment of the invention relates to an endpoint device for an audio delivery system. The endpoint device includes a housing, an audio signal processor mounted to the housing, a microphone in communication with the audio signal processor, and a receiver in communication with the audio signal processor. The device also includes a coding processor in communication with the audio signal processor where the coding processor associates a marker characteristic with an audio signal transmitted from the endpoint and at least one communications port in communication with the processor.

The coding processor includes a marking process where, in one arrangement, the marking process associates a marker characteristic with the audio signal transmitted from the endpoint device. In another arrangement, the marking process detects a marker characteristic with the audio signal received by the endpoint device from a second endpoint device. In one arrangement, the marker characteristic is a watermark and includes user specific information such as, for example, an endpoint device identification value, email address information, audio volume information, or uniform resource locator (URL) information. The watermark can also specify participation information of an endpoint device relating to the device's participation or non-participation in a communications session.

In another arrangement, the endpoint device includes an indicator that provides information to a user relating to the participation of a second endpoint device in communication with the endpoint device. For example, the indicator includes a visual indicator, such as a light emitting diode (LED) to indicate when a second endpoint has placed the first endpoint device on "hold" or has removed the first endpoint device from hold.

Another embodiment of the invention relates to an audio delivery device having a housing, an audio signal processor mounted to the housing, the audio signal processor decoding a marker characteristic associated with an audio signal transmitted from an endpoint device, a control processor in communication with the audio signal processor, the control processor receiving a decoded marker characteristic from the decoding processor and controlling the distribution of an audio signal component from the audio signal processor based upon the decoded marker characteristic, and at least one communications port in communication with the audio signal processor.

In one arrangement, the audio delivery device includes at least one communications port in communication with the control processor that allows transmission of marker characteristics by the control processor to an external device, such as a computer. The marker characteristics, in one arrangement, include URL information such that when delivered to an external computer, directs the user to a website that includes information regarding the presence and identity of active users within a multi-party teleconference. In another arrangement, the decoding processor of the audio delivery device includes an audio mixer, the audio mixer controlling a volume level of an audio signal based upon the characteristic of the endpoint device.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with an authentication manager application that when performed on the processor, produces an authentication manager process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with an authentication manager that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention can be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

The present invention is directed to an apparatus and method to selectively include an audio signal component, such as a hold tone, within an audio output signal, such as a composite audio signal from a multi-party teleconference, based upon a condition of an audio delivery system. The condition of the audio delivery system is, in one arrangement, based upon the number of active endpoint devices connected to the audio delivery system and based upon the presence of an endpoint signal from an endpoint device. The endpoint signal or characteristic information of the endpoint device indicates engagement of a hold function on an endpoint device. The audio delivery system utilizes the condition information and generates a control signal having a value that controls the inclusion or omission of the audio signal component based upon the condition information.

Figure 1:
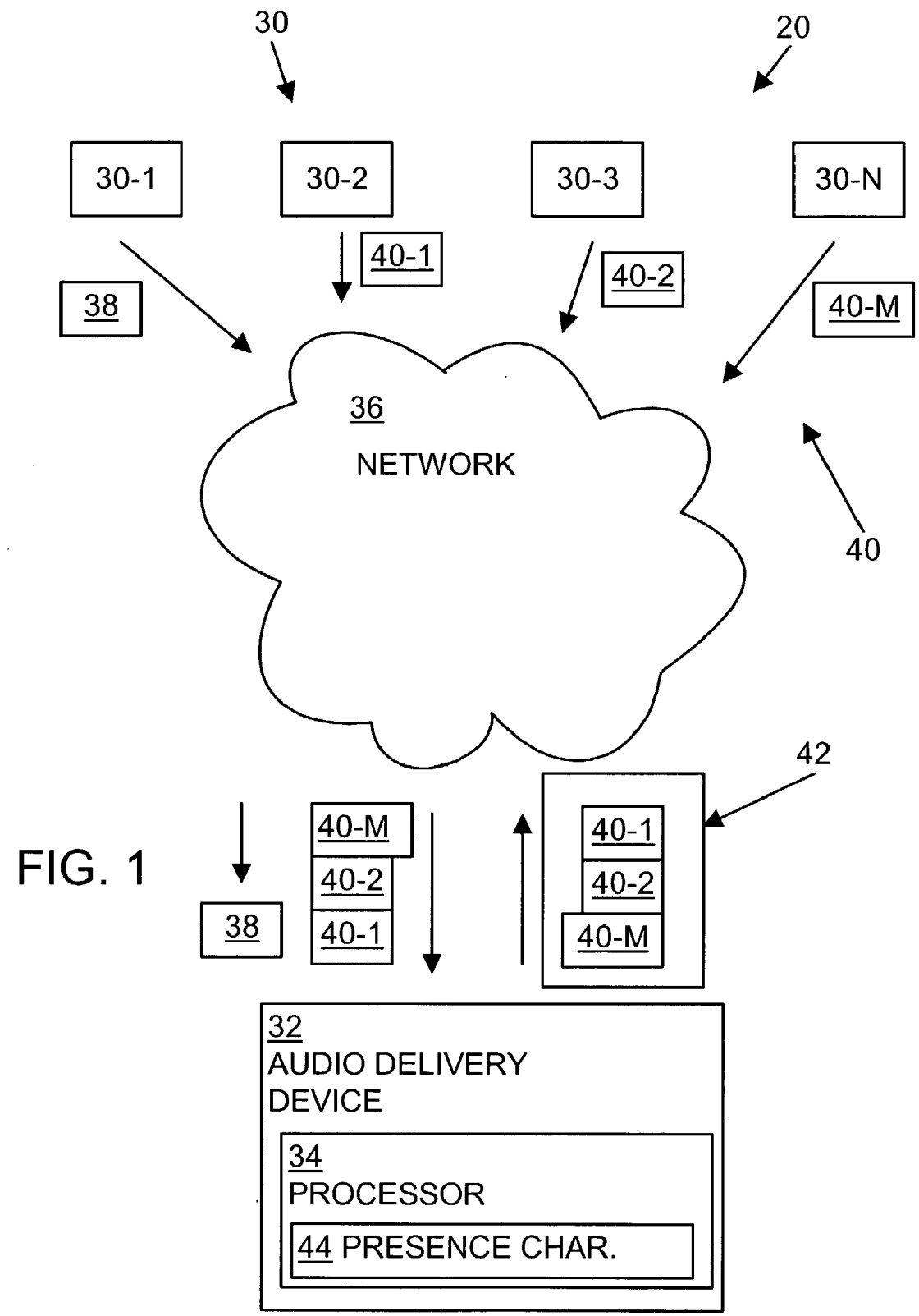
FIG. 1 is a block diagram of an audio delivery system that is suitable for use by the invention.

FIG. 1 illustrates an embodiment of an audio delivery system, given generally as 20. The audio delivery system 20 includes endpoint devices 30, a network 36, and an audio delivery device 32. The endpoint devices 30 are in communication with the audio delivery device 32 by way of the network 36. As shown, the endpoint devices 30 include devices 30-1, 30-2, 30-3, and 30-N. The description of the audio delivery system 20 is provided by way of example only. The audio delivery system 20, for example, operates as a telecommunications system, such as a voice over IP telecommunications system. The endpoint devices 30 for example operate as telecommunications devices, such as telephones or telephone handsets. The network 36, for example, is a telecommunications network or the Internet.

During operation of the audio delivery system 20, the endpoint devices 30 transmit audio signals 40 to the audio delivery device 32. For example, endpoint devices 30-2, 30-3, and 30-N deliver audio signals 40-1, 40-2, and 40-M, respectively, to the audio delivery device 32. The audio signals 40-1, 40-2, and 40-M are signals, for example, that carry a voice or sounds from a user.

The audio delivery device 32 receives, through the network 36, audio signals 40 from the endpoint devices 30 and distributes the signals 40 to the endpoint devices 30 as an audio output signal or composite audio signal 42. In the case where all endpoint devices 30-2, 30-3, and 30-N are active within the system 20, the audio delivery device 32 forms the composite audio signal 42 as a combination of the respective audio signals 40-1, 40-2, and 40-M received by the audio delivery device 32.

The endpoint devices 30 also transmit an endpoint signal 38 to the audio delivery device 32. For example, the endpoint device 30-1 delivers the endpoint signal 38 to the audio delivery device 32. The endpoint signal 38 indicates, in one embodiment, the endpoint device 30 or the user of the endpoint device 30 having engaged a hold function to suspend the transmission from or reception of audio signals by the endpoint device 30.

The endpoint signal 38 includes either an audio signal component, such as hold music, or a trigger, in one arrangement. In the case where the endpoint device 30 is configured to generate or distribute hold audio or hold music to the audio delivery system 20 to indicate engagement of a hold function, the endpoint signal 38 includes an audio signal component, such as hold music. In the case where an external device, such as the audio delivery device 32, is configured to generate or distribute audio to the audio delivery system 20 to indicate engagement of a hold function within the system 20, the endpoint signal 38 includes a trigger that triggers or causes the external device 32 to distribute the audio signal component, or hold music, within the audio delivery system 20.

The audio delivery device 32 also includes a processor 34 that selectively includes an audio signal component within an audio output signal 42. In one arrangement, inclusion of the audio signal component by the delivery device 32 is based upon the number of endpoint devices 30 actively connected to the audio delivery device 32 and based upon the presence of the endpoint signal 38 provided by the endpoint devices 30, in one embodiment.

In one arrangement, the processor 34 determines the number of endpoint devices 30 within the audio delivery system 20, indicated as the presence characteristic 44, and the presence of an endpoint signal 38. If the processor 34 determines the presence of an endpoint signal 38 and detects greater than two active endpoint devices 30 within the audio delivery system 20, the audio delivery device 32 transmits an audio output signal 42 that includes audio signals, shown as 40-1, 40-2, and 40-N, and does not include an audio signal component, such as hold music or a hold tone. Therefore, when the audio output signal 42 is transmitted to the endpoint devices 30-1, 30-2, and 30-M, the endpoint devices 30 only receive a composite signal having signals 40-1, 40-2, and 40-N and do not receive, as part of the composite signal 42, the audio signal component indicating endpoint device 30-1 has engaged a hold function. Alternately, if the processor 34 detects that there are only two active endpoint devices 30 within the audio delivery system 20, such as 30-1 and 30-2, and detects the presence of an endpoint signal 38, the audio delivery device 32 transmits the audio output signal 42 in one of a variety of ways. In one way, the audio delivery device 32 transmits, to the endpoint devices 30-1, 30-2, an audio output signal 42 having an audio signal component, or hold tone, and the audio signal 40-1, corresponding to the endpoint device 30-2. Alternately, the audio delivery device 32 transmits, to the endpoint devices 30-1, 30-2, an audio output signal 42 having only an audio signal component, or hold tone. In this arrangement, the audio signal 40-1 is not part of the composite output signal 42.

Figure 2:
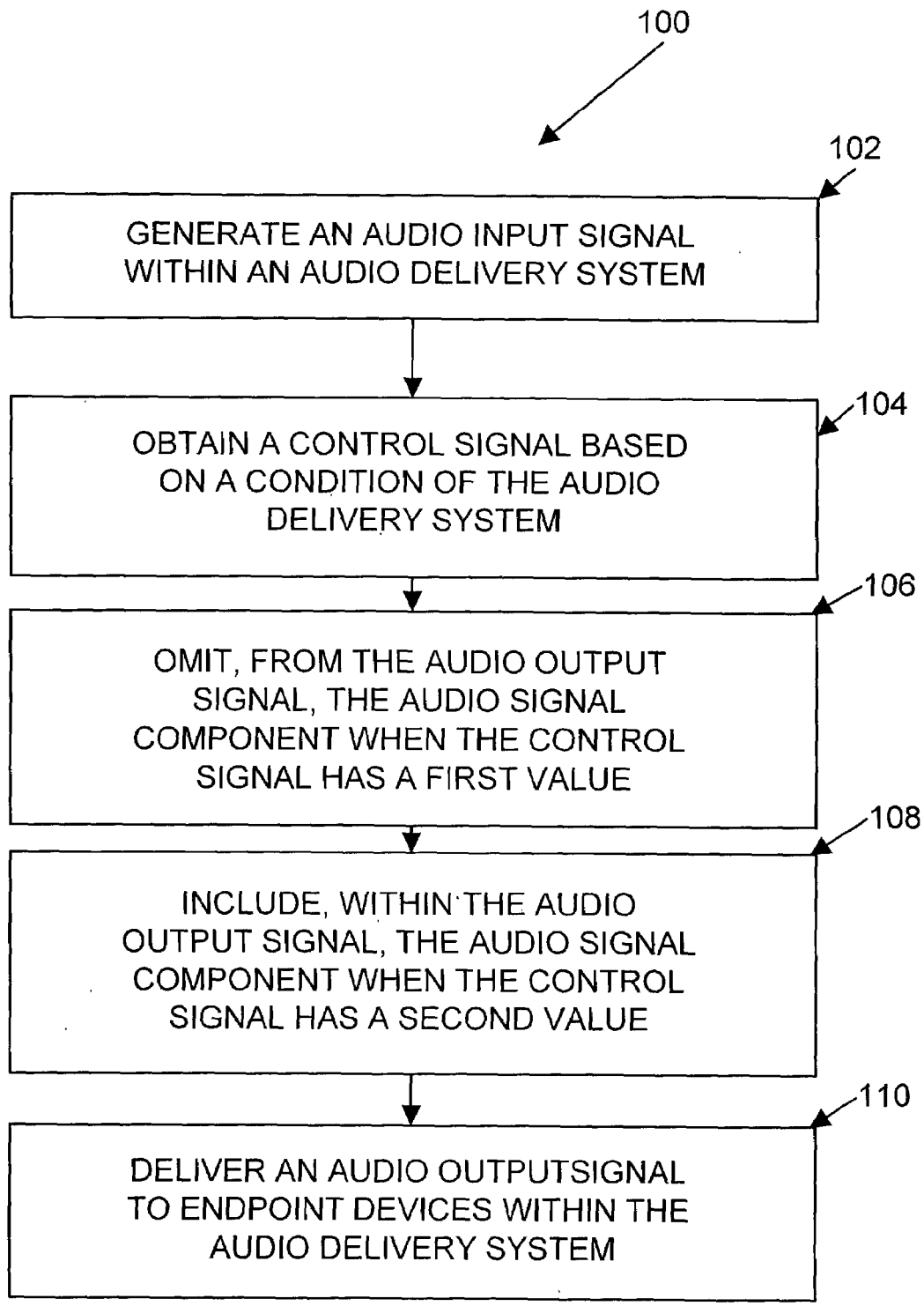
FIG. 2 is a flowchart of a procedure that is performed by the audio delivery system of FIG. 1.

FIG. 2 summarizes operation of the audio delivery system 20. FIG. 2 illustrates a procedure 100 for selectively including an audio signal component within the audio output signal 42. The audio signal component 38, in one arrangement, includes hold music or a hold tone and indicates that one endpoint device 30 within an audio delivery system 20 has engaged a hold function. Engagement of the hold function prevents delivery of an audio signal 40 from an endpoint device 30 to the audio delivery system 20. Engagement of the hold function also prevents reception of a composite audio signal 42 from the audio delivery system 20 by an endpoint device 30.

In step 102, an endpoint device 30 generates an audio input signal within the audio delivery system 20. The audio signal is a signal carrying audio information, such as a user's voice or music, for example.

Next, in step 104, an audio delivery device 32 obtains a control signal 178 based upon a condition of the audio delivery system 20. For example, the control signal 178 is a bit pattern or a voltage stored in a register or memory. In one embodiment, the processor 34 in the audio delivery device 32 creates the control signal 178. Both the number of active endpoint devices 30 within the audio delivery system 20 and the presence of an endpoint signal 38 from an endpoint device 30 determine the condition of the audio delivery system 20.

The value of the control signal 178 is based upon, in one arrangement, the number of active endpoint devices 30 within the audio delivery system 20 and the presence of an endpoint signal 38 transmitted to the audio delivery device 32 by an endpoint device 30. For example, if the audio delivery device 32 detects the presence of an endpoint signal 38 and detects that there are greater than two active endpoints 30 within the audio delivery system 20, the audio delivery device 32 creates a control signal 178 having a first value representing this condition. If the audio delivery device 32 detects the presence of an endpoint signal 38 and detects that there are only two active endpoints 30 within the audio delivery system 20, the audio delivery device 32 creates a control signal 178 having a second value, representing this condition (i.e. that there are exactly two active endpoint devices 30 within the audio distribution system).

In step 106, the audio delivery device 32 omits from an audio output signal 42 an audio signal component 38 when the control signal 178 has a first value. For example, the audio delivery device 32 omits the audio signal component 38 from the audio output signal 42 when the control signal 178 has a value indicating the presence of greater than two endpoint devices 30 active within the audio delivery system 20 and that one of the endpoint devices 30 has engaged a hold function. As shown in FIG. 2, the audio output signal 42 includes the audio signals 40-1, 40-2, and 40-M as part of the audio output signal 42 transmitted from the active endpoint devices 30-2, 30-3, and 30-M and does not include the audio signal component 38 that indicates a user of one of the endpoint devices 30 has engaged a hold function.

In step 108, the audio delivery device 32 includes, within the audio output signal 42, an audio signal component 38 when the control signal 178 has a second value, which is different than the first value. For example, the audio delivery device 32 includes the audio signal component 38 from the audio output signal 42 from when the control signal 178 has value indicating the presence of only two active endpoint devices 30 within the audio delivery system 20 and that the user of one of the endpoint devices 30 has engaged a hold function.

In step 110, the audio delivery device 32 delivers an audio output signal 42 to endpoint devices 30 within the audio delivery system 20. In one arrangement, the audio output signal 42 is not received by an endpoint device 30-1 having an engaged hold function. Disengagement of the hold function allows the endpoint device 30-1 to receive the audio output signals 42 from the delivery device 32.

Figure 3:
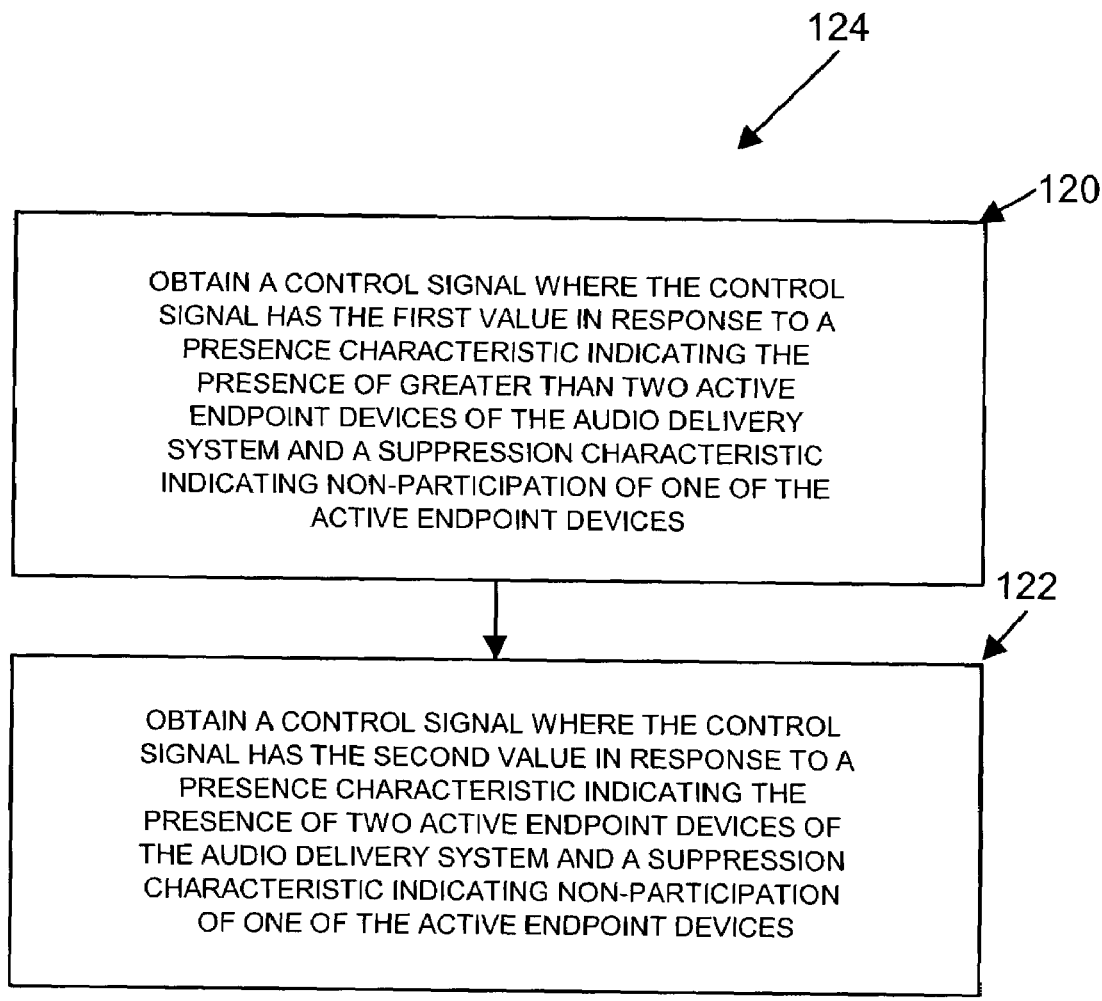
FIG. 3 is a flowchart of a procedure that is suitable for use as a step of obtaining a control signal in the procedure of FIG. 2.
Figure 4:
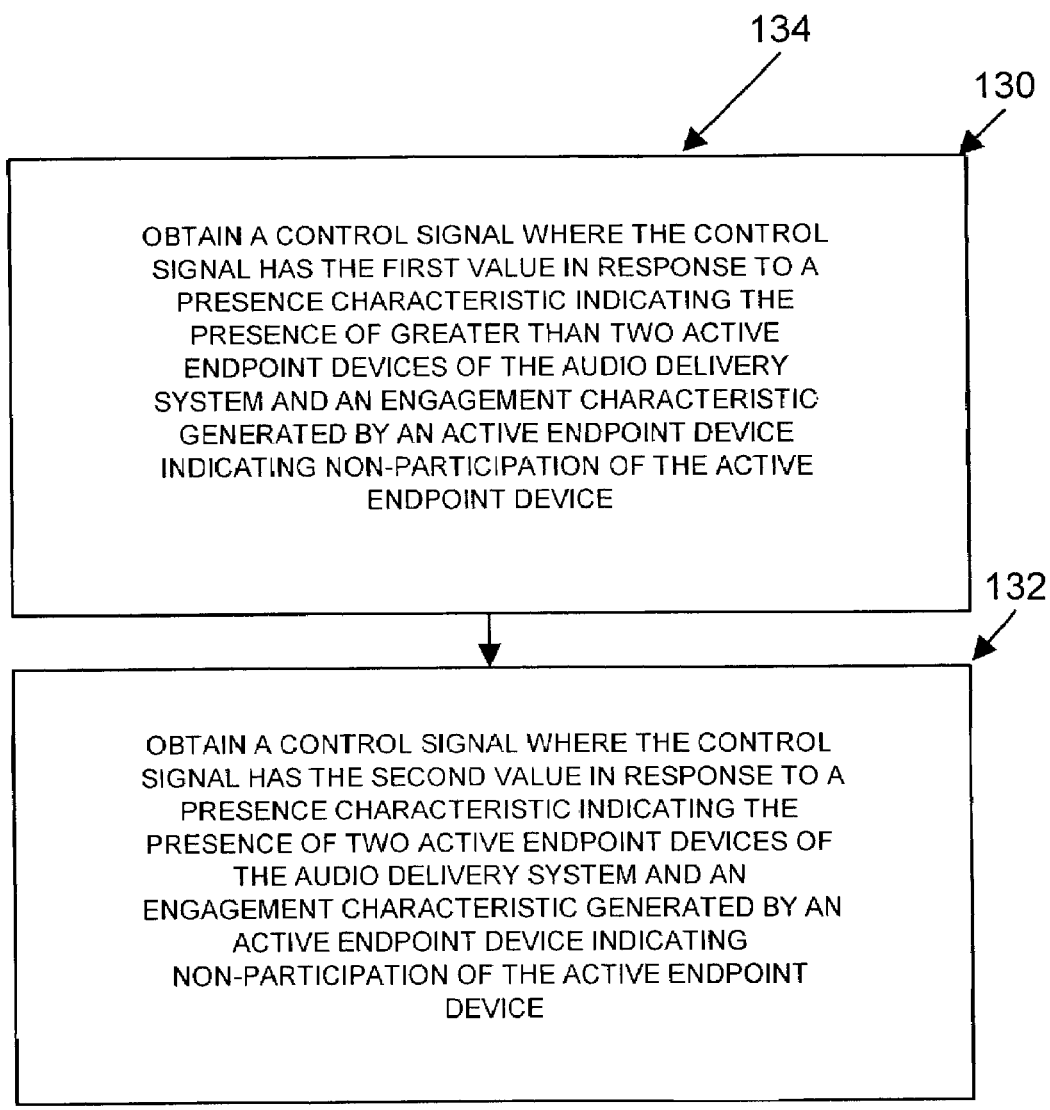
FIG. 4 is a flowchart of a procedure that is suitable for use as the step of obtaining a control signal in the procedure of FIG. 2.
Figure 5:
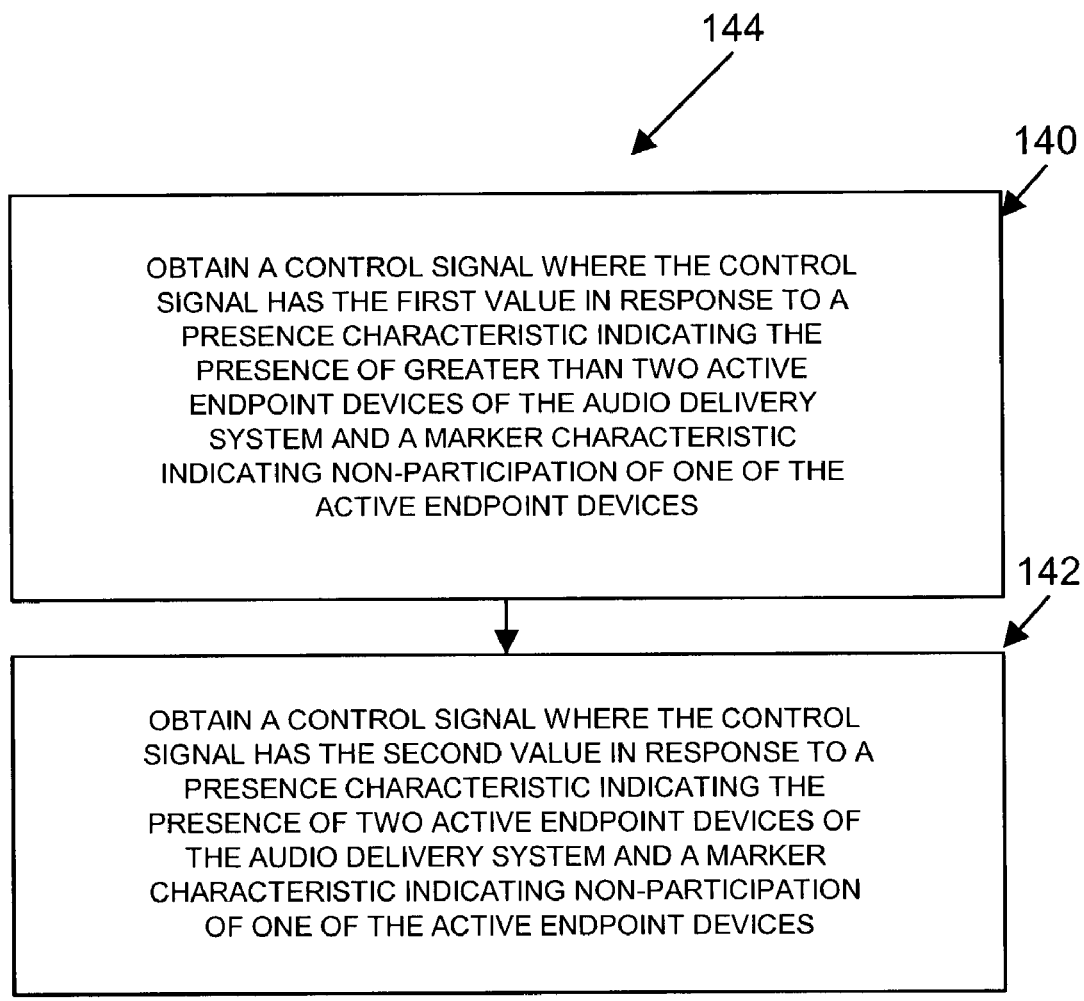
FIG. 5 is a flowchart of a procedure that is suitable for use as the step of obtaining a control signal in the procedure of FIG. 2.

As described above, the condition of the audio delivery system 20 determines the value for the control signal within the system 20 and, therefore, determines the inclusion or omission of an audio signal component 38 with an audio output signal 42. FIGS. 3 through 5 illustrate embodiments for a method 124 to obtain a value for a control signal 178 based on a condition of the audio delivery system. Each embodiment involves a different condition of the audio delivery system 20.

The audio delivery device 32, in one embodiment, obtains a control signal 178 based upon the condition of a presence characteristic and a suppression characteristic. FIG. 3 shows a procedure 124 for obtaining a control signal 178, suitable for use as step 104 in FIG. 2. FIG. 3 illustrates a procedure 124 for obtaining a value for a control signal 178 based upon a presence characteristic 44 and a suppression characteristic 38 of the audio delivery system 20.

In step 120, the control signal 178 has a first value in response to a presence characteristic 44 indicating the presence of greater than two active endpoint devices 30 in the audio delivery system 20 and a suppression characteristic 38 indicating non-participation of the one of the active endpoint devices 30. The first control signal value causes the audio delivery device 32 to omit an audio signal component 38 from an audio output signal 42 delivered within the system 20.

In step 122, the control signal 178 has a second value in response to a presence characteristic 44 indicating the presence of two active endpoint devices 30 in the audio delivery system and a suppression characteristic 38 indicating non-participation of one of the active endpoint devices 30. The second control signal value causes the audio delivery device 32 to include an audio signal component within an audio output signal delivered within the system 20.

The presence characteristic 44 indicates the number of active endpoint devices 30 within the audio delivery system 20. An active endpoint device 30 is an endpoint device 30 engaged in telecommunications within the audio delivery system 20. The number of active endpoint devices 30, in one arrangement, is determined by the audio delivery device 32 or by a central system within the audio delivery system in order to determine the presence of a multi-party (greater than two users or active endpoints) teleconference. For example, in a voice over IP system that allows users to engage in telephonic communications over Internet Protocol (IP) based networks, protocol signaling takes place between a user's endpoint device 30 and a control system 32, such as a conference call system. Within the protocol signaling process, the endpoint device 30 transmits control messages to a control system 32 where the audio delivery device 32 operates as a control system. The control system uses the control messages to determine the number of active endpoints or participants in a teleconference and therefore determines a presence characteristic of the system. In another example, the audio delivery device 32 detects the number of individual audio signals received by the audio delivery device 32. By detecting the number of audio signals received, the audio delivery device 32 determines the number of active endpoints 30 within the system 20 and, therefore, determines the presence characteristic of the system 20.

The presence characteristic, in one arrangement, is a watermark that indicates the presence of an endpoint device 30 within the audio delivery system 20. In the process of watermarking, the endpoint device 30 associates or encodes information with an audio signal 40, such as a signal carrying a user's voice. The audio signal 40 and encoded information are then transmitted to a receiving device, such as the audio delivery device 32, that decodes the watermarked information from the audio signal 40. For example, when endpoint devices 30-2, 30-3, and 30-N are actively connected to the audio delivery system 20, the endpoint devices 30 encode or integrate the respective audio signals 40-1, 40-2 and 40-M with a watermark 190, indicating that the respective endpoint devices 30-2, 30-3, and 30-N are active within the audio delivery system 20. The endpoint devices 30 then distribute the audio signal 40 and watermark combination to the audio delivery device 32. When the audio delivery device 32 receives the audio signals 40-1, 40-2 and 40-M, the audio delivery device 32 decodes the watermarks 190 from the audio signals 40 and uses these watermarks 190 to detect the number of endpoint devices 30 active within the audio delivery system 20.

The suppression characteristic indicates the non-participation of an active endpoint device 30 in a teleconference. In one arrangement, the suppression characteristic is an endpoint signal 38 generated by the endpoint device 30 caused by engagement of a hold function on the endpoint device 30. The endpoint signal 38 includes either an audio signal component, such as hold music, or a trigger, for example. In the case where the endpoint device 30 is configured to generate or distribute hold audio to the audio delivery system 20 to indicate engagement of a hold function, the endpoint signal 38 is the hold audio or audio signal component. In the case where an external device, such as the audio delivery device 32, is configured to generate or distribute an audio signal component to the audio delivery system 20 to indicate engagement of a hold function within the system 20, the endpoint signal 38 is a trigger that triggers or causes the external device to distribute the audio signal component, or hold music, within the audio delivery system 20.

In one arrangement, the endpoint signal 38 is a watermark 190 indicating engagement of a hold function on an endpoint device 30 and acts as a trigger for the delivery device 32. For example, engagement of a hold function causes the endpoint device 30 to integrate a watermark, indicating engagement of the hold function, with an audio signal 40. The endpoint device 30 distributes the watermark and audio signal to the audio delivery device 32. Upon reception of the audio signal

40, the audio delivery device 32 then decodes the watermark from the audio signal 40 and determines that a user of the endpoint device 30 has engaged a hold function. If the audio delivery device detects more than two active endpoint devices 30 within the system 20, the watermark triggers the delivery device 32 to omit an audio signal component from the output composite signal 42. As explained below, the process of watermarking encodes an audio signal, for example, with data without disrupting the content of the audio signal. The use of the watermark allows the data to be transmitted through existing telecommunications systems without disruption of the data.

The audio delivery device 32, in another embodiment, obtains a control signal based upon the condition of a presence characteristic and an engagement characteristic. FIG. 4 shows a procedure 134 for obtaining a control signal 178, suitable for use as step 104 in FIG. 2. FIG. 4 illustrates a procedure 134 for obtaining a value for a control signal 178 based upon a presence characteristic 44 and an engagement characteristic 38 of the audio delivery system 32.

In step 130, the control signal 178 has a first value in response to a presence characteristic 44 indicating the presence of greater than two active endpoint devices 30 in the audio delivery system 20 and an engagement characteristic 38 generated by an active endpoint device 30 indicating non-participation of the active endpoint device 30. The first control signal value causes the audio delivery device 32 to omit an audio signal component from an audio output signal 42.

In step 132, the control signal 178 has the second value in response to a presence characteristic 44 indicating the presence of two active endpoint devices 30 in the audio delivery system and an engagement characteristic 38 generated by an active endpoint device 30 indicating non-participation of the active endpoint device. The second control signal value causes the audio delivery device 32 to include an audio signal component within the audio output signal 42.

As described above, the presence characteristic 44 indicates the number of active endpoint devices 30 within the audio delivery system 20. The methods for determining the presence characteristic within the system are also described above.

As stated, the engagement characteristic indicates non-participation of an active endpoint device 30 within the audio delivery system 20 or that a user has removed himself from a teleconference. The engagement characteristic, in one example, is an endpoint signal 38 that is generated by the active endpoint device 30 based upon engagement of a series of functions from the active endpoint device 30. For example, a the endpoint device 30 generates the endpoint signal 38 when a user sequentially engages a mute function and a hold function on the endpoint device 30.

In one arrangement, the engagement characteristic is a trigger that prevents distribution of an audio signal component within the system. For example, in the case where the endpoint device 30 is configured to transmit hold music after engagement of a hold function, when a user sequentially engages a mute function and a hold function, in the presence of greater than two active endpoint devices 30, the endpoint device 30 generates a trigger that disables or prevents the endpoint device 30 from distributing the audio signal component to the system 20. In one arrangement, the endpoint device 30 includes a processor that disables distribution of the audio signal component, in response to this trigger signal. In the case where the audio delivery device 32 is configured to transmit a hold signal after detecting engagement of a hold function, when a user sequentially engages a mute function and a hold function, the endpoint device 30 generates an endpoint signal 38 that is a trigger and transmits the signal 38 to the audio delivery device 32. If the presence characteristic 44 indicates more than two endpoint devices 30 in the system 20, the endpoint signal 38 triggers the audio delivery device 32 to omit the audio signal component from the composite audio signal 42.

The audio delivery device 32, in one embodiment, obtains a control signal 178 based upon the condition of a presence characteristic 44 and a marker characteristic 190. FIG. 5 shows a procedure 144 for obtaining a control signal 178, suitable for use as step 104 in FIG. 2. FIG. 5 illustrates a procedure 144 for obtaining a value for a control signal 124, based upon a presence characteristic 44 and a marker characteristic 190 of the audio delivery system 20.

In step 140, the control signal 178 has a first value in response to a presence characteristic 44 indicating the presence of greater than two active endpoint devices 30 in the audio delivery system 20 and a marker characteristic 190 indicating non-participation of one of the active endpoint devices 30. The first control signal value causes the audio delivery device 32 to omit an audio signal component 38 from an audio output signal 42.

In step 142, the control signal 178 has a second value in response to a presence characteristic 44 indicating the presence of two active endpoint devices 30 in the audio delivery system 20 and a marker characteristic 190 indicating non-participation of one of the active endpoint devices 30. The second control signal value causes the audio delivery device 32 to include an audio signal component 38 within the audio output signal 42.

Again, as described above, the presence characteristic 44 indicates the number of active endpoint devices 30 within the audio delivery system 20. The methods for determining the presence characteristic 44 within the system 20 are also described above.

The marker characteristic 190 in one arrangement is digital information associated with an audio signal 40. For example, the marker characteristic 190 is a tag that indicates engagement of a hold function by an endpoint device 30. In the case where the endpoint device 30 is configured to transmit an audio signal component, the marker characteristic 190 is an in-band tag or an out-of-band tag associated with the audio signal component 38 that indicates engagement of a hold function on the endpoint device 30. For example, assume a user engages a hold function on an endpoint device 30. When using in-band tagging, engagement of the hold function causes the endpoint device 30 to embed a tag 190 within an audio signal component 38 transmitted from the device 30. When using out-of-band tagging, engagement of the hold function causes the endpoint device 30 to associate a separate signal path, in parallel, with the audio signal component 38 transmitted from the device 30. A receiver of the audio signal component 38, therefore, detects the endpoint device 30 having engaged a hold function and the presence of an audio signal component 38 from the endpoint device 30 based upon the presence of the tag 190.

In another embodiment, the marker characteristic 190 is a watermark. Watermarking encodes data within a digital audio signal without disrupting the content of the digital audio signal. During a digital signal processing procedure, an analog to digital converter digitizes an analog audio signal and corresponds digital audio values with the analog signal to form a digital audio signal. During a watermarking procedure, a watermarking function modifies the digital audio values to embed watermark data within the digital audio signal.

In the process of watermarking, for example, assume a digitized audio signal includes the values of 1, 3, 7, 17, 21, 18, and 22. During a watermarking procedure, a watermarking function encodes information onto the digital audio signal such that the corresponding, resulting values for the digitized audio signal are 1, 3, 8, 18, 20, 15, and 23. In this example, small modifications are made to the original digitized audio signal. These modifications are detectable during a watermark decoding process and do not disrupt or change the audio content of the digital audio signal. When a decoder 184 receives a watermarked audio signal, the decoder 184 separates the signal into watermark portion and an audio signal portion.

The use of watermarks enables transmission of information within an audio delivery system 20. Watermarking allows data to be conveyed from a watermarking device, such as an endpoint device 30, to a watermark decoding device, such as an audio delivery system, through existing telecommunications networks or systems without adversely affecting the data. For example, transmission of an audio signal, integrated with watermarked data, through a telecommunications network does not produce errors in the system caused by the watermarked data.

In the case where the marker characteristic 190 is a watermark, engagement of a hold function on an endpoint device 30 generates the watermark. In the case where the endpoint device 30 is configured to transmit the audio signal component within the audio distribution system 20, when a user engages a hold function, the endpoint device 30 generates a watermark that indicates the engagement of the hold function. The endpoint device 30 then encodes the watermark 190 onto the audio signal component 38 and transmits the audio signal component to the audio delivery device 32. The audio delivery device 32 receives the watermarked audio signal component and decodes the watermark from the audio signal component 38. When the delivery device 32 detects more than two endpoint devices 30 in the system 20, the delivery device 32 suppresses distribution of the audio signal component 38, based upon the watermark information 190.

In the case where an audio delivery device 32 is configured to transmit the audio signal component, when a user engages a hold function on an endpoint device 30, the endpoint device 30 generates a watermark indicating the engagement of the hold function. The endpoint device 30 then encodes the watermark 190 onto an audio signal 40, such as digitized voice audio, and transmits the audio signal to an audio delivery device 32. When the audio delivery device 32 receives the audio signal 40, the device 32 decodes the watermark from the audio signal. In the case where there are more than two endpoint devices 30 connected to the system 20, the device 32 omits the audio signal component from the composite signal 42, based upon the watermark information.

In an audio delivery system 20, other types of information can also be embedded within an audio signal by way of watermarking. In one arrangement, the watermark 190 indicates the identification of an endpoint device 30 or an endpoint device identification value, such as a user name, location, or contact information of a user or an endpoint device connected to an audio delivery system 20. In another arrangement, the watermark 190 also indicates participation information or the status of a endpoint device 30, such as whether or not the endpoint device 30 has engaged a hold function. In another arrangement, the watermark 190 includes audio volume information from a source endpoint device 30 to indicate the audio level at which an audio signal 40 is transmitted from the source endpoint device 30 to other endpoint devices within an audio delivery system 20. In another arrangement, the watermark 190 includes uniform resource locator (URL) information, indicating, for example, a website that provides information as to the identities of the endpoint devices 30 connected to a audio delivery system 20. In this arrangement, the endpoint device 30, such as an IP phone, includes a web browser that links a user to the URL address, based on the watermark information. In another arrangement, the watermark 190 includes email address information for the user of the device 30. The email address information can include Electronic Numbering (ENUM) protocol information where the ENUM protocol maps a user's telephone number to an Internet protocol address.

Figure 6:
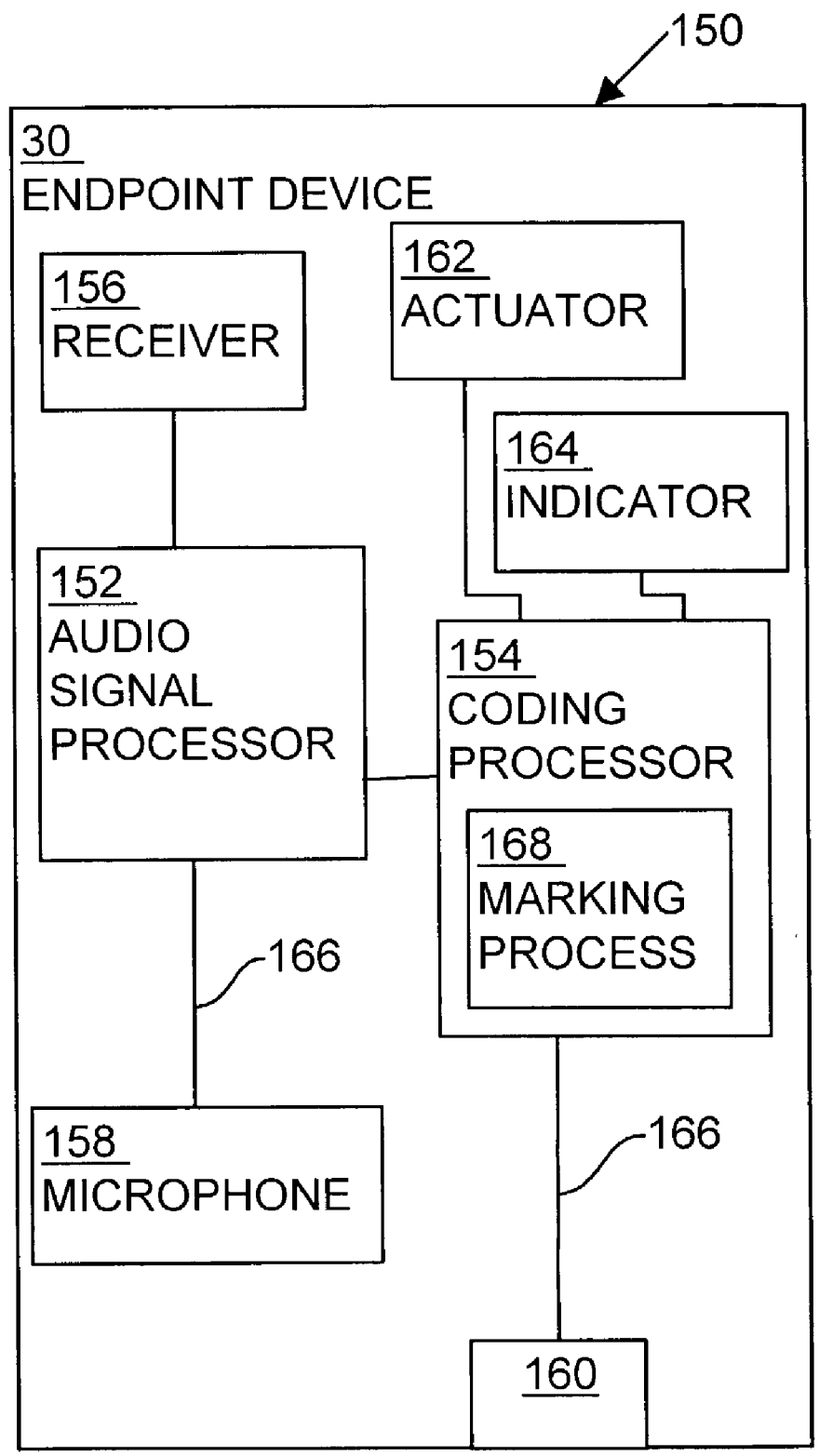
FIG. 6 is a block diagram of an endpoint device suitable for use in the system of FIG. 1.

The audio delivery system 20 includes endpoint devices 30. FIG. 6 illustrates an embodiment of an endpoint device 30 utilized in transmission and reception of audio signals 40. The endpoint device 30 is suitable for use as any or all of the endpoint devices 30 shown in FIG. 1. The endpoint device 30 transmits either audio signals 40 that represent audio input from a user, such as a signal generated in response to a user's voice, or audio signal components 38, such as hold music or a hold tone, that are transmitted in response to engagement of a hold function. The endpoint device 30 includes a housing 150 having an audio signal processor 152 and a coding processor 154. The audio signal processor 152 is connected to a receiver 156 and an audio signal generation device 158, such as a microphone, by an interconnect mechanism 166. The coding processor 154 is connected to an actuator or control panel 162, a status indicator 164, and a port 160 by an interconnect mechanism 166. The coding processor 154 includes a marking process 168 used to associate or encode a marker characteristic 190 with a transmitted audio signal and to detect or decode a marker characteristic 190 from a received audio signal 40.

The endpoint device 30, in one arrangement, delivers encoded audio signals 40 to the audio delivery system 20. A voice or audio source generates an audio signal 40 within the microphone 158. The signal 40 is then transferred to the audio signal processor 152. The audio signal processor 152 digitizes the audio signal 40 from the microphone 158 and transfers the digitized signal to the coding processor 154. The coding processor 154, utilizing the marking process 168, encodes the digitized audio signal to include a marker characteristic 190. For example, when a user actuates the control panel or actuator 162 to engage a hold function, the coding processor 154 encodes the digital audio signal 40 with a marker characteristic 190, such as a watermark, indicating engagement of the hold function.

The watermark 190 includes user-specific information or information relating to the endpoint device 30 or user of the endpoint device 30. For example, the user-specific information indicates the identification of an endpoint device 30 or endpoint device identification information, such as a user name, location, or contact information of a user or endpoint device 30. In another arrangement, the user-specific information also indicates endpoint participation information or the status of an endpoint device 30, such as whether or not the endpoint device 30 has engaged a hold function. In another arrangement, the user-specific information includes audio volume information from a source endpoint device 30 to indicate the audio level at which an audio signal 40 is transmitted from the source endpoint device 30 to other endpoint devices. In another arrangement, the user-specific information includes uniform resource locator (URL) information, indicating, for example, a website that provides information as to the identities of the endpoint devices 30 connected to a audio delivery system 20. In this arrangement, the endpoint device 30, such as an IP phone, includes a web browser that links a user to the URL address, based on the watermark information. In another arrangement, the user-specific information includes email address information for the user of the device 30. The email address information can include Electronic Numbering (ENUM) protocol information where the ENUM protocol maps a user's telephone number to an Internet protocol address.

After the endpoint device 30 encodes the signal 40, the device 30 delivers the encoded signal 190 to the audio delivery system 20 using the port 160.

The endpoint device 30, in another arrangement, also receives marked digital audio signals 40 from the audio delivery system 20. Audio signals 40 from an external device, such as a second endpoint device 30 or an audio delivery device 32 are received by the port 160 and are transferred to the coding processor 154. In the case where the audio signals 40 include a marker characteristic 190, such as a watermark, the coding processor 154, utilizing the marking process 168, detects or decodes the marker characteristic from the audio signal 40 and transfers the audio signal 40 to the audio signal processor 152. The audio signal processor 152 then transfers the audio signal 40 to the receiver 156, thereby allowing a user to receive communications from the audio delivery system 20.

The endpoint device 30 includes an indicator 164 used to indicate the status or participation of a second endpoint device within the audio delivery system 20. The indicator is, in one arrangement, a visual indicator, such as a liquid crystal display (LCD), a light emitting diode (LED), or a VU meter. In using the indicator 164, for example, assume a first endpoint device engages a hold function, thereby placing a second endpoint device on hold. Furthermore, assume the second endpoint device 30 receives hold music as a result of the action by the first endpoint device 30. The indicator 164 provides a user of the second endpoint device with the ability to monitor the status of the first endpoint device 30 (i.e. whether on hold or off hold) without having to continually listen for the termination of the hold music by the first endpoint device 30. For example, in the case where the indicator 164 is an LED, when the LED produces a first color, the second user determines that the first user has engaged a hold function on his endpoint device 30. When the LED produces a second color, the second user determines that the first user has disengaged a hold function on his endpoint device 30.

In another arrangement, the second endpoint device 30 receives hold music from the first endpoint device 30 and monitors the level or volume of the audio signal 40 to detect a change in audio level from the first endpoint device 30. The indicator displays the change in audio level. A change in audio level from the first endpoint device 30, in one arrangement, indicates a transition from hold music to a "live" audio signal that includes communication from the user of the first endpoint device. The second user visually detects the change in audio level by the indicator 164.

In another arrangement, the second endpoint device 30 receives hold audio, such as hold music, that includes a marker characteristic 190 from the first endpoint device 30. For example, the signal from the first endpoint device 30 includes a watermark 190 that indicates engagement of a hold function by the first endpoint device. The coding processor 154 of the second endpoint device 30 decodes the watermark 190 and indicates, on the indicator 164, that the second endpoint device 30 is on hold or that the first device 30 has engaged a hold function. The coding processor 154 of the second endpoint device 30 continues to monitor the audio signal watermark 190 to detect a change in the watermark caused by the first endpoint device 30 disabling or disengaging the hold function. When the processor 154 detects such a change in the watermark 190, it indicates, on the indicator 164, that the second endpoint device 30 is no longer on hold or that the first device 30 has disengaged a hold function.

Figure 7:
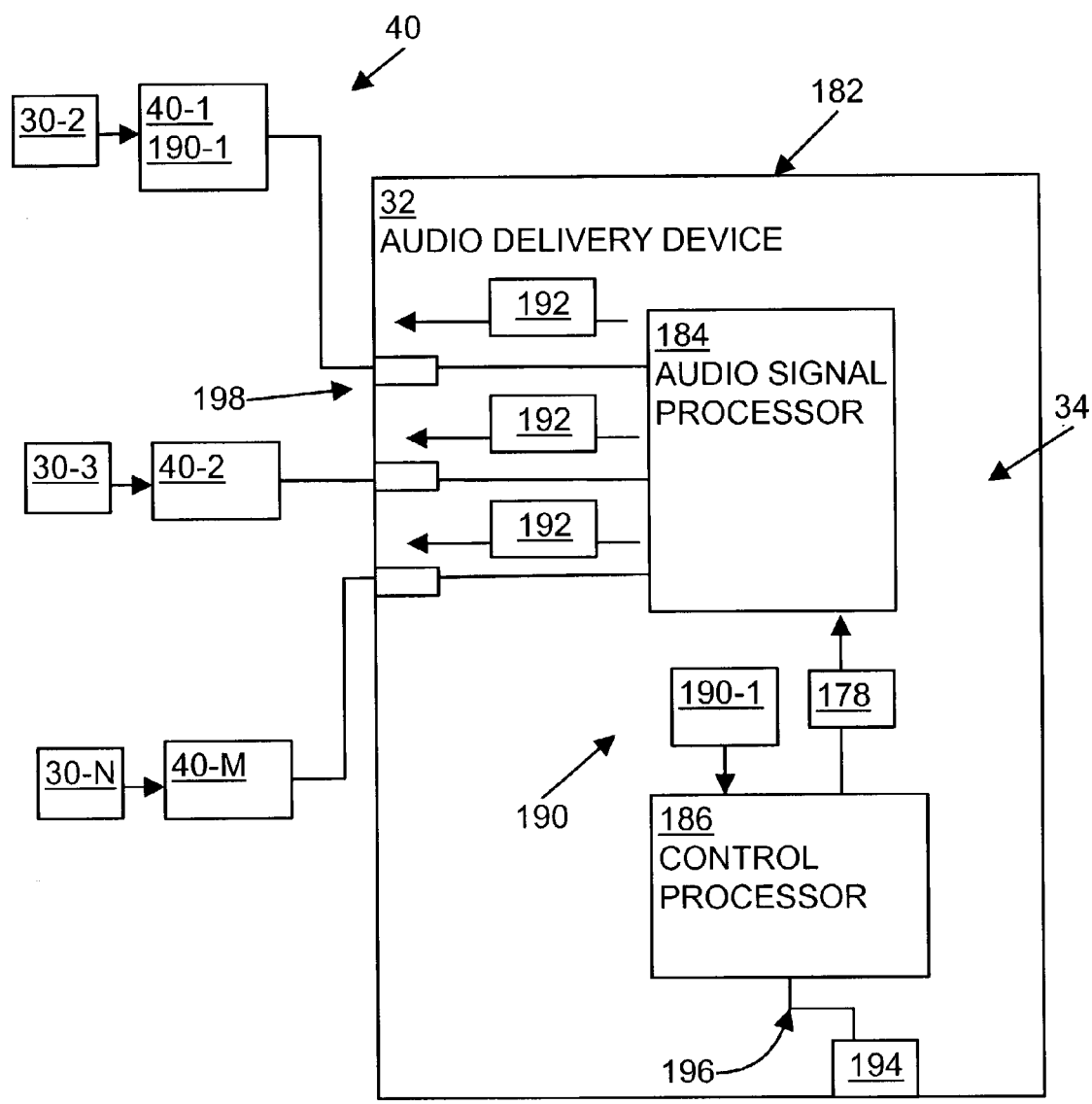
FIG. 7 is a block diagram of an audio delivery device suitable for use in the system of FIG. 1.

The audio delivery system 20 includes audio delivery devices 32. FIG. 7 illustrates an embodiment of an audio delivery device 32 configured to process audio signals 40 that include marker characteristics 190, such as watermarks. As illustrated the audio delivery device 32 receives audio signals 40-1, 40-2, and 40-M from respective endpoint devices 30-2, 30-3, and 30-N. The audio delivery device 32 includes a plurality of communications interfaces or ports 198, each port 198 in communication with an individual endpoint device 30, in one embodiment. Each port 198 receives and audio signal 40 from an endpoint device 130. In an alternate embodiment, the audio delivery system has a single port 198 that receives audio signals 40-1, 40-2, and 40-M from endpoint devices 30-2, 30-3, and 30-N. For example, in a Voice-over IP (Internet protocol) system, a single data port receives packets that form each of the audio signal data streams 40-1, 40-2, and 40-M. The audio delivery device 32 multiplexes each of the data streams 40-1, 40-2, and 40-M from the single port 198.

The audio delivery device 32 has a processor 34 in communication with the ports 198 by an interconnection device 196. In one arrangement, the processor 34 includes an audio signal processor 184 and a control processor 186.

The audio signal processor 184, in one arrangement, decodes the marker characteristics 190 from the audio signal 40 and transmits the marker 190 to the control processor 186. For example, the audio signal processor 184 receives audio signal 40-1 and decodes a marker characteristic 190, such as a watermark, 190-1 from the signal 40-1. The audio signal processor 184 transmits the marker characteristic 190-1 to the control processor 186. The control processor 186, in turn, receives the marker characteristic and generates a control signal 178 that prevents the distribution of an audio signal component or hold tone by the audio signal processor 184 within the audio delivery system 20.

In one arrangement, the audio signal processor 184 of the audio delivery device 32 includes an audio mixer or a volume controller that adjusts the audio level of the received audio signals 40-1, 40-2, and 40-M when forming a composite audio output signal 192. For example, in a multi-party teleconference, assume an endpoint device 30 transmits, to the audio delivery device 32, an audio signal 188-1 having a marker characteristic indicating engagement of a hold function. The audio signal processor 32 decodes the marker characteristic 190-1 and transmits the characteristic 190-1 to the control processor 186. The control processor 186, in response to the marker 190-1, generates a control signal 178 that causes the audio signal processor 184 to omit an audio signal component from the output signal 192. In response to the control signal 178, the audio signal processor 184 decreases the volume of the audio signal component such that the audio signal component is inaudible or is omitted from the composite output signal 192.

In another arrangement, the control processor 186 is in communication with a communications interface 194, such as a port. The communications interface 194 allows the control processor 186 to deliver decoded marker characteristics 190-1 to external devices. For example, in the case where the marker characteristic 190-1 includes URL information, the control processor 186 delivers the URL information to displays, such as computer monitors, associated with the endpoint devices 30 engaged in a teleconference.

Figure 8:
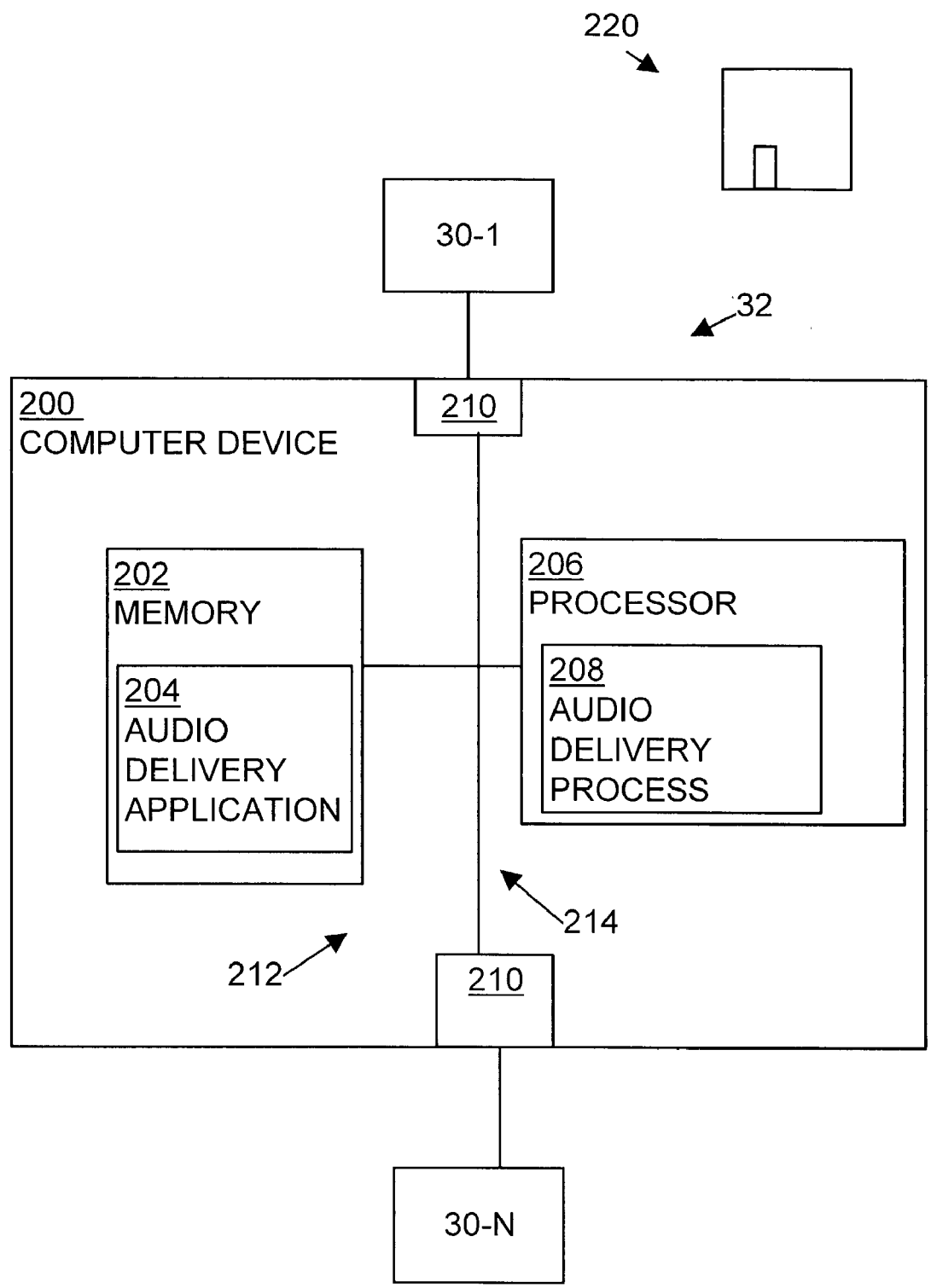
FIG. 8 is a block diagram of a computer device, configured as an audio delivery device, suitable for use in the system of FIG. 1.

The audio delivery system 20 includes an audio delivery device 32 that is, is one arrangement, a computer. FIG. 8 illustrates a computer device 200, configured to run as an audio delivery device 32, that shows one embodiment of the invention. A computer program product 220 includes an application or logic instructions that are loaded into the computer device 200 to configure the device 200 to perform as an audio delivery device 32.

The computer device 200 includes an interconnection mechanism 214 such as a data bus or circuitry that interconnects a controller 212, that in one arrangement, includes a memory 202 and a processor 206, and one or more communications interfaces 210. The memory 202 can be of any type of volatile or non-volatile memory or storage system such as a computer memory (e.g., random access memory (RAM), read only memory (ROM), or another type of memory) disk memory, such as hard disk, floppy disk, optical disk, for example. The memory 202 is encoded with logic instructions and/or data that, in one embodiment of the computer device 200, form an audio delivery application 204 configured according to embodiments of the invention. In other words, the audio delivery application 204 represents software coding instructions and/or data that reside within the memory or storage 202, or within any computer readable medium accessible to the computer device 200.

The processor 206 represents any type of circuitry or processing device such as a central processing unit, controller, application specific integrated circuit, programmable gate array, or other circuitry that can access the audio delivery application 204 encoded within the memory 202 over the interconnection mechanism 214 in order to run, execute, interpret, operate, or otherwise perform the audio delivery application 204 logic instructions. In other words, in another embodiment of the computer device 200, the audio delivery process 208 represents one or more portions of the logic instructions of the audio delivery application 204 while being executed or otherwise performed on, by, or in the processor 206 within the computer device 200.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

What is claimed is:

1. In an audio delivery system, a method for selectively including an audio signal component within an audio output signal, the method comprising the steps of:
obtaining a control signal based on a condition of the audio delivery system;
omitting, from the audio output signal, the audio signal component when the control signal has a first value; and
including, within the audio output signal, the audio signal component when the control signal has a second value which is different than the first value;
wherein the step of obtaining the control signal includes the step of:
generating the control signal such that (i) the control signal has the first value in response to a presence characteristic indicating the presence of greater than two active endpoint devices of the audio delivery system and a suppression characteristic indicating non-participation of one of the active endpoint devices, and (ii) the control signal has the second value in response to a presence characteristic indicating the presence of two active endpoint devices of the audio delivery system and a suppression characteristic indicating non-participation of one of the active endpoint devices;
further comprising the step of generating the presence characteristic wherein the presence characteristic is a watermark indicating the presence of an endpoint device within the audio delivery system.

2. The method of claim 1, further comprising the step of:
integrating the watermark with an audio signal within the audio delivery system; and
distributing the audio signal and watermark within the audio delivery system.

3. The method of claim 1, further comprising the step of generating the suppression characteristic wherein the suppression characteristic is a watermark indicating the non-participation of an active endpoint device.

4. The method of claim 3, further the step of comprising:
integrating the watermark with an audio signal within the audio delivery system; and
distributing the audio signal and watermark within the audio delivery system.

5. The method of claim 1, further comprising the step of generating the suppression characteristic wherein the suppression characteristic is an endpoint signal generated by an active endpoint device.

6. The method of claim 1 wherein the step of including comprises the step of including, within the audio output signal, hold audio when the control signal has a second value which is different than the first value.

7. The method of claim 1, wherein:
the suppression characteristic comprises a signal generated by an active endpoint device in response to engagement of a hold function on the endpoint device; and
the audio signal component comprises a hold tone generated in response to the engagement of the hold function on the endpoint device.

8. In an audio delivery system, a method for selectively including an audio signal component within an audio output signal, the method comprising the steps of:
obtaining a control signal based on a condition of the audio delivery system;
omitting, from the audio output signal, the audio signal component when the control signal has a first value; and
including, within the audio output signal, the audio signal component when the control signal has a second value which is different than the first value;
wherein the step of obtaining the control signal includes the step of:
generating the control signal such that (i) the control signal has the first value in response to a presence characteristic indicating the presence of greater than two active endpoint devices of the audio delivery system and a marker characteristic indicating non-participation of one of the active endpoint devices, and (ii) the control signal has the second value in response to a presence characteristic indicating the presence of two active endpoint devices of the audio delivery system and a marker characteristic indicating non-participation of one of the active endpoint devices;

further comprising the step of generating the marker characteristic wherein the marker characteristic is a tag associated with an audio signal within the audio delivery system.

9. The method of claim 8, wherein:

the suppression characteristic comprises a signal generated by an active endpoint device in response to engagement of a hold function on the endpoint device; and the audio signal component comprises a hold tone generated in response to the engagement of the hold function on the endpoint device.

10. An audio delivery system, comprising:

at least two endpoint devices; and an audio delivery device coupled to the at least two endpoint devices, the audio delivery device having:
  at least one communications interface,
  a controller, and
  an interconnection mechanism coupling the at least one communications interface and the controller
  wherein the controller is configured to:
    obtain a control signal based on a condition of the audio delivery system;
    omit, from an audio output signal to be delivered to at least one of the endpoint devices, an audio signal component when the control signal has a first value; and
    include, within the audio output signal to be delivered to at least one of the endpoint devices, the audio signal component when the control signal has a second value which is different than the first value;

wherein the controller is configured to generate the control signal such that (i) the control signal has the first value in response to a presence characteristic indicating the presence of greater than two active endpoint devices of the audio delivery system and a suppression characteristic indicating non-participation of one of the active endpoint devices, and (ii) the control signal has the second value in response to a presence characteristic indicating the presence of two active endpoint devices of the audio delivery system and a suppression characteristic indicating non-participation of one of the active endpoint devices;

wherein the endpoint device is further configured to generate the presence characteristic wherein the presence characteristic is a watermark indicating the presence of the endpoint device within the audio delivery system.

11. The audio delivery system of claim 10 wherein the endpoint device is configured to:

integrate the watermark with an audio signal within the audio delivery system; and distribute the audio signal and watermark within the audio delivery system.

12. The audio delivery system of claim 10 wherein the endpoint device is configured to generate the suppression characteristic wherein the suppression characteristic is a watermark indicating the non-participation of the endpoint device.

13. The audio delivery system of claim 12 wherein the endpoint device is configured to integrate the watermark with an audio signal within the audio delivery system; and distribute the audio signal and watermark within the audio delivery system.

14. The audio delivery system of claim 10 wherein the endpoint device is configured to generate the suppression characteristic wherein the suppression characteristic is an endpoint signal generated by an active endpoint device.

15. The audio delivery system of claim 10 wherein the controller is further configured to include, within the audio output signal, hold audio when the control signal has a second value which is different than the first value.

16. The audio delivery system of claim 10 wherein the controller comprises a memory and a processor.

17. The audio delivery system of claim 10, wherein the suppression characteristic comprises a signal generated by an active endpoint device in response to engagement of a hold function on the endpoint device; and the audio signal component comprises a hold tone generated in response to the engagement of the hold function on the endpoint device.

18. An audio delivery system, comprising:

at least two endpoint devices; and an audio delivery device coupled to the at least two endpoint devices, the audio delivery device having:
  at least one communications interface,
  a controller, and
  an interconnection mechanism coupling the at least one communications interface and the controller
  wherein the controller is configured to:
    obtain a control signal based on a condition of the audio delivery system;
    omit, from an audio output signal to be delivered to at least one of the endpoint devices, an audio signal component when the control signal has a first value; and
    include, within the audio output signal to be delivered to at least one of the endpoint devices, the audio signal component when the control signal has a second value which is different than the first value;
  wherein the controller is further configured to
    generate the control signal such that (i) the control signal has the first value in response to a presence characteristic indicating the presence of greater than two active endpoint devices of the audio delivery system and a marker characteristic indicating non-participation of one of the active endpoint devices, and (ii) the control signal has the second value in response to a presence characteristic indicating the presence of two active endpoint devices of the audio delivery system and a marker characteristic indicating non-participation of one of the active endpoint devices;
  wherein the endpoint device is further configured to generate the marker characteristic wherein the marker characteristic is a tag associated with an audio signal within the audio delivery system.

19. The audio delivery system of claim 18, wherein the suppression characteristic comprises a signal generated by an active endpoint device in response to engagement of a hold function on the endpoint device; and the audio signal component comprises a hold tone generated in response to the engagement of the hold function on the endpoint device.

20. An endpoint device for an audio delivery system, the endpoint device comprising:

an audio signal processor;

an audio signal generation device in communication with the audio signal processor;

a receiver in communication with the audio signal processor;

a coding processor in communication with the audio signal processor, the coding processor associating a marker characteristic with an audio signal transmitted from the endpoint; and at least one communications port in communication with the processor.

21. The endpoint device of claim 20 wherein the coding processor comprises a marking process, the marking process associating a marker characteristic with the audio signal transmitted from the endpoint device.

22. The endpoint device of claim 20 wherein the coding processor comprises a marking process, the marking process detecting a marker characteristic with the audio signal received by the endpoint device from a second endpoint device.

23. The endpoint device of claim 20 wherein the marker characteristic is a watermark.

24. The endpoint device of claim 23 wherein the watermark comprises user-specific information.

25. The endpoint device of claim 24 wherein the user-specific information is chosen from the group consisting of uniform resource locator information, endpoint device identification information, email address information, endpoint participation information, or audio volume information.

26. The endpoint device of claim 25 wherein the email address information comprises electronic numbering protocol information.

27. The endpoint device of claim 22 further comprising a indicator, the indicator providing information as to participation of a second endpoint device in communication with the endpoint device.

28. An audio delivery device comprising:

an audio signal processor, the audio signal processor decoding a marker characteristic associated with an audio signal transmitted from an endpoint device;

a control processor in communication with the audio signal processor, the control processor receiving a decoded marker characteristic from the decoding processor and controlling the distribution of an audio signal component from the audio signal processor based upon the decoded marker characteristic; and at least one communications port in communication with the audio signal processor.

29. The audio delivery device of claim 28 wherein the marker characteristic comprises a watermark.

30. The audio delivery device of claim 28, further comprising at least one communications port in communication with the control processor, the communications port allowing transmission of marker characteristics by the control processor to an external device.

31. The audio delivery device of claim 28 wherein the decoding processor further comprises an audio mixer, the audio mixer controlling a volume level of an audio signal component based upon the marker characteristic of the endpoint device.

32. A computer program product having a computer-readable medium including computer program logic encoded thereon that, when performed on a processor in a computerized device having a coupling of a memory, a processor, and at least one communications interface causes the processor to:

obtain a control signal based on a condition of the audio delivery system;

omit, from the audio output signal, the audio signal component when the control signal has a first value; and include, within the audio output signal, the audio signal component when the control signal has a second value which is different than the first value.

33. An audio delivery system comprising:

at least two endpoint devices; and an audio delivery device coupled to the at least two endpoint devices, the audio delivery device having:

at least one communications interface, a controller, and an interconnection mechanism coupling the at least one communications interface and the controller wherein the controller is configured to selectively include an audio signal component within an audio output signal, such means including:

means for obtaining a control signal based on a condition of the audio delivery system;

means for omitting, from the audio output signal to be delivered to at least one of the endpoint devices, the audio signal component when the control signal has a first value; and means for including, within the audio output signal to be delivered to at least one of the endpoint devices, the audio signal component when the control signal has a second value which is different than the first value.

* * * * *